United States Patent [19]

Nihei et al.

[11] Patent Number: 5,558,196
[45] Date of Patent: Sep. 24, 1996

[54] DEVICE FOR DETECTING LIMITS OF ROTATIONAL MOTION IN A ROBOT

[75] Inventors: Ryo Nihei; Akihiro Terada, both of Fujiyoshida; Kyozi Iwasaki, Hachioji; Masatoshi Ito, Yamanashi, all of Japan

[73] Assignee: Fanuc Ltd., Yamanashi, Japan

[21] Appl. No.: 319,103

[22] Filed: Oct. 6, 1994

[30] Foreign Application Priority Data

Oct. 7, 1993 [JP] Japan .................................. 5-251682

[51] Int. Cl.⁶ .................................................. B25J 13/00
[52] U.S. Cl. .............................. 192/142 R; 901/13
[58] Field of Search .............................. 192/138, 139, 192/142 R; 901/11, 12, 13

[56] References Cited

U.S. PATENT DOCUMENTS 4,879,499  11/1989  Iwata ....................................... 901/12 X
4,890,713  1/1990   Pagano ................................. 192/142 R

FOREIGN PATENT DOCUMENTS 3-87908  4/1991  Japan ..................................... 192/138

Primary Examiner—Richard M. Lorence
Attorney, Agent, or Firm—Nikaido, Marmelstein, Murray & Oram LLP

[57] ABSTRACT

A device for detecting the limits of the rotational motion of a rotating member in an industrial robot is provided. The rotating member rotates in a first and a second rotational direction about an axis relative to a fixed member. The device comprises a limit switch provided on one of the members and a contact piece, provided on the fixed member, for activating the limit switch. The contact piece is rotatable between first and second angular position about an axis parallel to the axis of rotating member.

6 Claims, 7 Drawing Sheets

176°

181°

173.5°

DEVICE FOR DETECTING LIMITS OF ROTATIONAL MOTION IN A ROBOT

BACKGROUND OF THE INVENTION

1. Field of the Invention

The invention relates to an industrial robot, in particular, to a device for detecting the limits of the rotational motion of a rotating member in an industrial robot.

2. Description of the Related Art

An industrial robot has a robot arm, and a robot wrist is provided at the distal end of the robot arm. An end effector, such as a robot hand, is mounted onto the robot wrist. The robot arm has a plurality of articulated portions which include a fixed member and a rotating member which rotates relative to the fixed member. The end effector is moved along a desired path due to the relative motion between the rotational and fixed members according to a program in a robot control unit. In order to prevent the robot arm moving beyond a predetermined limit, a device for detecting the limits of rotational motion, such as a limit switch, is provided at the articulated portion.

Referring to FIG. 10, a prior art device for detecting the limits of rotational motion is illustrated. The device is provided at the articulated portion. In FIG. 10, a fixed member 46 has dogs 48a and 48b. On the other hand, a rotating member (not shown) has a limit switch 44 electrically connected to a robot control unit (not shown). The limit switch 44 may be a conventional plunger type. The rotating member can rotate relative to the fixed member 46 about an a'-axis.

At the home position, indicated by O', the limit switch 44 is drawn with solid lines. When the rotating member rotates in the counterclockwise direction from the home position, the limit switch 44 also rotates in the counterclockwise direction therewith. When the limit switch 44 rotates to the limit of the rotational motion indicated by X, the limit switch 44 contacts the dog 48a. The limit switch 44 detects that the rotating member has rotated to the limit and sends a signal to the robot control unit. Upon receiving the signal, the robot control unit stops the rotating member.

On the other hand, when the rotating member rotates in the clockwise direction from the home position O', the limit switch 44 also rotates in the clockwise direction therewith. When the limit switch 44 rotates to the limit of the rotational motion shown by Y, the limit switch 44 contacts the dog 48b. The limit switch 44 detects that the rotating member has rotated to the other limit and sends a signal to the robot control unit. Upon receiving the signal, the robot control unit stops the rotating member.

Thus, the limits of the rotational motion are detected by the contact between the limit switch 44 and the dogs 48a or 48b, and this stops the rotating member of the robot moving beyond the limit of the rotational motion. In FIG. 10, the total rotational movement possible is the rotational angle of 162 degrees in the clockwise and in the counterclockwise directions from the home position. Thus, the rotating member can rotate within the range of 324 degrees about the a'-axis.

As the motion of the rotating member is limited to within the range of 324 degrees about the a'-axis by the device shown in FIG. 10. That is, the prior art device does not allow an angular range of more than 360 degrees. Thus, the robot with the prior art device has a problem in that, sometimes, the robot cannot move along a desired path and it takes long time to teach the robot arm. For that reason, some robots are not provided with a device for limiting the motion of the robot arm. This is a problem from the view point of safety around the robot.

SUMMARY OF THE INVENTION

Therefore, the object of the invention is to provide a device for detecting the limits of the rotational range of the rotating member at more than 360 degrees.

To realize the invention, a device for detecting the limits of the rotational motion of a rotating member in an industrial robot, which the rotating member rotates relative to a fixed member in a first and a second rotational direction about an axis, the device comprising a limit switch provided on one of the members and a contact piece for activating the limit switch. The contact piece is rotatable between first and second angular position about an axis parallel to the axis of the members.

In the preferable embodiment of the invention, one of the members is a fixed base having substantially a circular section and the other is a rotating base rotatably mounted onto the fixed base about the axis. The fixed base includes substantially a cylindrical island provided on an end face of the fixed base at substantially the center thereof so that the center axis of the island is aligned with that of the fixed base and has a diameter smaller than that of the fixed base. The contact piece is attached to the fixed base. The limit switch is a plunger type having a detecting portion at an end of the limit switch, and being attached to the rotating base so as to be able to contact the contact piece with the detecting portion when the rotating base rotates the limit switch to a position near one of the first and second limits. The contact piece rotates about the axis thereof when the limit switch contacts the contact piece with the detecting portion of the limit switch.

In one aspect of the invention, the contact piece is a limit cam having first and second abutment surfaces. The limit cam is rotated, about the axis thereof by the contact between the limit cam and the detecting portion of the limit switch, to the first or second angular position when the rotating base is rotated to first and second limits of rotational motion respectively. One of the abutment surfaces of the limit cam abuts the outer surface of the island when the limit cam rotates to one of the first or second angular positions, and the rotation of the limit cam being stopped by the abutment, the detecting portion of the limit switch being depressed by the stopped limit cam, whereby the limit switch is activated.

In another embodiment of the invention, one of the members is a fixed base having substantially a circular section and the other is a rotating base rotatably mounted onto the fixed base about the axis. The rotating base includes a circumferential wall along a circle, about the axis, having a diameter larger than that of the fixed base. The contact piece is attached to the rotating base, and the limit switch is a plunger type having a detecting portion at an end of the limit switch, and is attached to the fixed base so as to be able to contact the contact piece with the detecting portion when the rotating base rotates the contact piece to a position near one of the first and second limits. The contact piece rotates about the axis thereof when the limit switch contacts the contact piece with the detecting portion of the limit switch.

Preferably, the contact piece is a limit cam having first and second abutment surfaces. The limit cam is rotated about the axis thereof by the contact between the limit cam and the detecting portion of the limit switch to the first and second angular position when the rotating base is rotated to first or second limits of rotational motion respectively. One of the abutment surfaces of the limit cam abuts an inner surface of the circumferential wall when the limit cam rotates to one of the first or second angular positions, and the rotation of the limit cam is stopped by the abutment, the detecting portion of the limit switch is depressed by the stopped limit cam, whereby the limit switch is activated.

DESCRIPTION OF THE PREFERRED EMBODIMENTS

Figure 1:
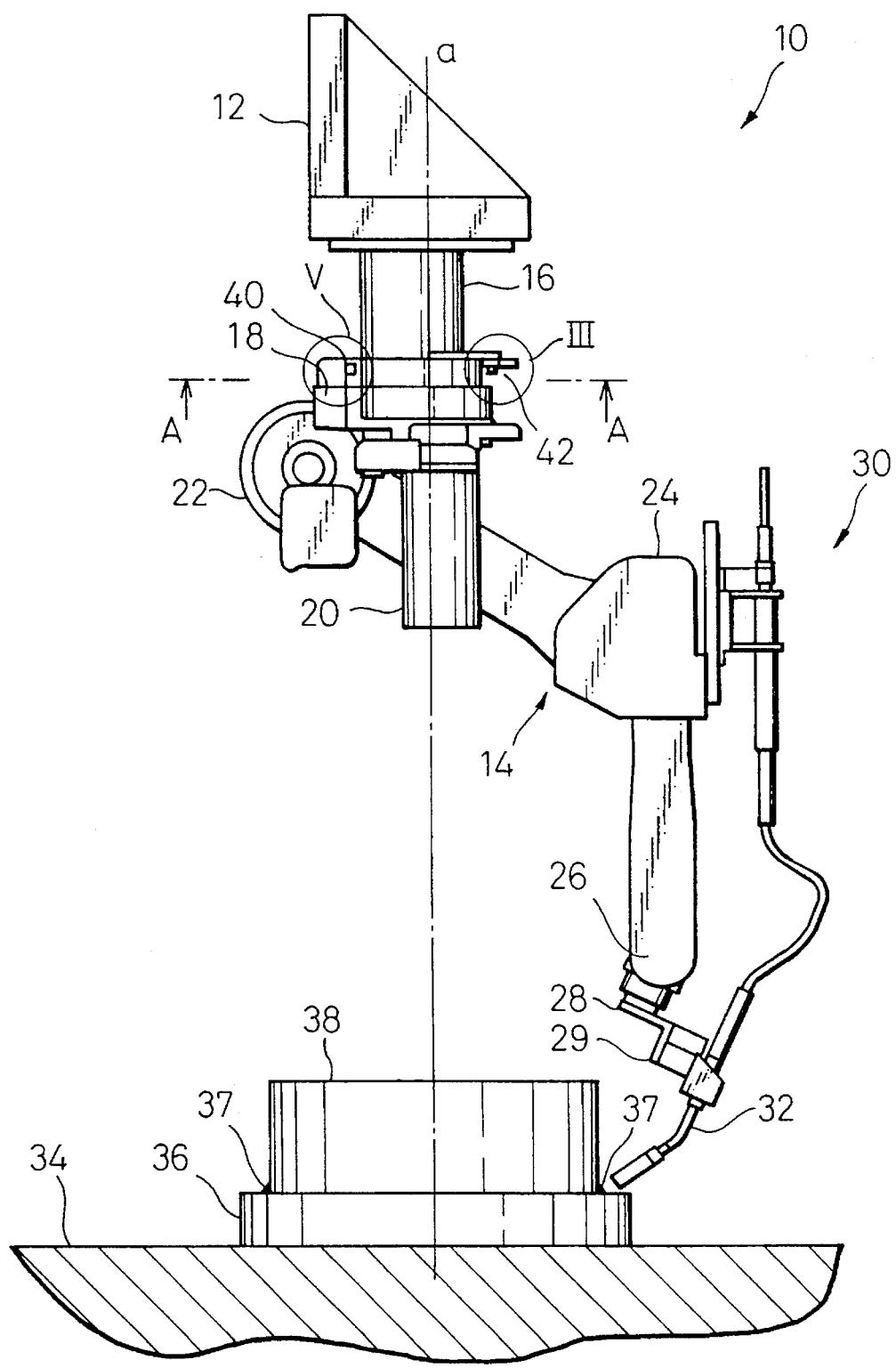
FIG. 1 is a side elevation of a welding robot which includes a device for detecting the limits of the motion according to the invention.

FIG. 1 illustrates a schematic side elevation of a suspended welding robot 10 with the device of the invention. In FIG. 1, the welding robot 10 comprises a robot arm 14 having a plurality of articulated portions 22, 24 and 26. The welding robot 10 is suspended from a base 12 provided at a high place such as a ceiling of a factory. The welding robot 10 comprises a fixed base 16 fixed to the base 12 and a rotating base 18 mounted onto the fixed base 16. The robot arm 14 is mounted onto the rotating base 18 via the articulation 22. The rotating base 18 is rotated by an electrical motor 20 about an a-axis within a predetermined angular range. Thus, the robot arm 14 is also rotated about the a-axis within the predetermined angular range. The robot arm 14 is provided with a known welding device 30 at the distal end thereof. The torch 32 of the welding device 30 is mounted onto the robot wrist 28 of the robot arm 16 by a bracket 29.

The welding robot 10 is provided with a robot control unit (not shown). The robot control unit is a known type and is preferably a programmable numerical controller. In order to weld along a predetermined welding line, the welding robot 10 moves the torch 32 according to a program in the robot control unit. FIG. 1 illustrates an example in which a fillet welding is being carried out between a rectangular plate 36 and a cylindrical pipe 10 by the welding robot 10.

The rectangular plate 36 is placed on a table or a floor 34. The cylindrical pipe 38 is placed on the upper face of the plate 36. The robot arm 14 is held above the plate so as to keep the end of the torch 32 near and at substantially the same height as that of a welding portion or a welding line 37. The robot arm 14 rotates about the a-axis with the welding device 30 activated. Thus, the cylindrical pipe 38 is welded to the rectangular plate 36 along the circular welding line 37. Although the welding robot 10 welds along the circular welding line 37, in FIG. 1, it can also weld along a straight line.

The welding robot 10 comprises a device for detecting the limits of rotational motion about the a-axis, and the device contains a limit switch assembly and a cam assembly. The device is described with reference to FIGS. 2 to 5.

Figure 2:
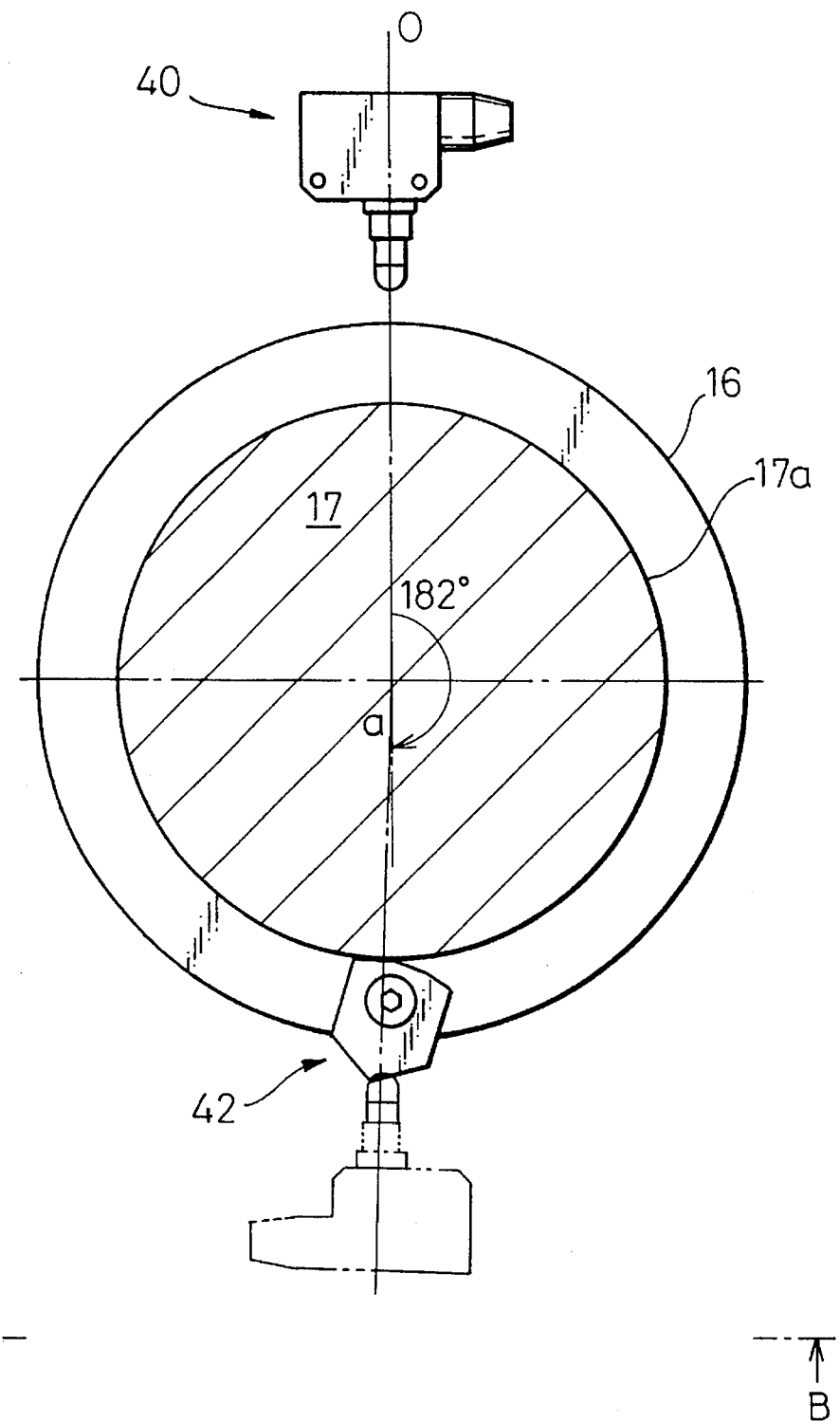
FIG. 2 is a schematic section along line A—A in FIG. 1 and illustrates the arrangement of the limit switch assembly and the cam assembly of the device according to one embodiment of the invention.

FIG. 2 illustrates a schematic side elevation from the direction A—A in FIG. 1. In order to simplify the drawing, the rotating base 18 is not shown in FIG. 2. However, the rotating base 18 is mounted onto the fixed base in a known manner. The limit switch assembly 40 is attached to the rotating base 18 for rotation therewith about the a-axis. In FIG. 2, the home position of the limit switch assembly 40 is indicated by O. In FIG. 2, the rotating base and the limit switch assembly 40 is also shown as having rotated 182 degrees about the a-axis in the clockwise direction from the home position O. However, it can be seen that the rotating base and the limit switch assembly 40 can also rotate 182 degrees about the a-axis in the counterclockwise direction from the home position O. That is, the rotating base and the limit switch assembly 40 can rotate relative to the fixed base 16 within a total angular range of 364 degrees. The angular range of 182 degrees in FIG. 2 is an example and the invention is not limited to this value.

Figure 3:
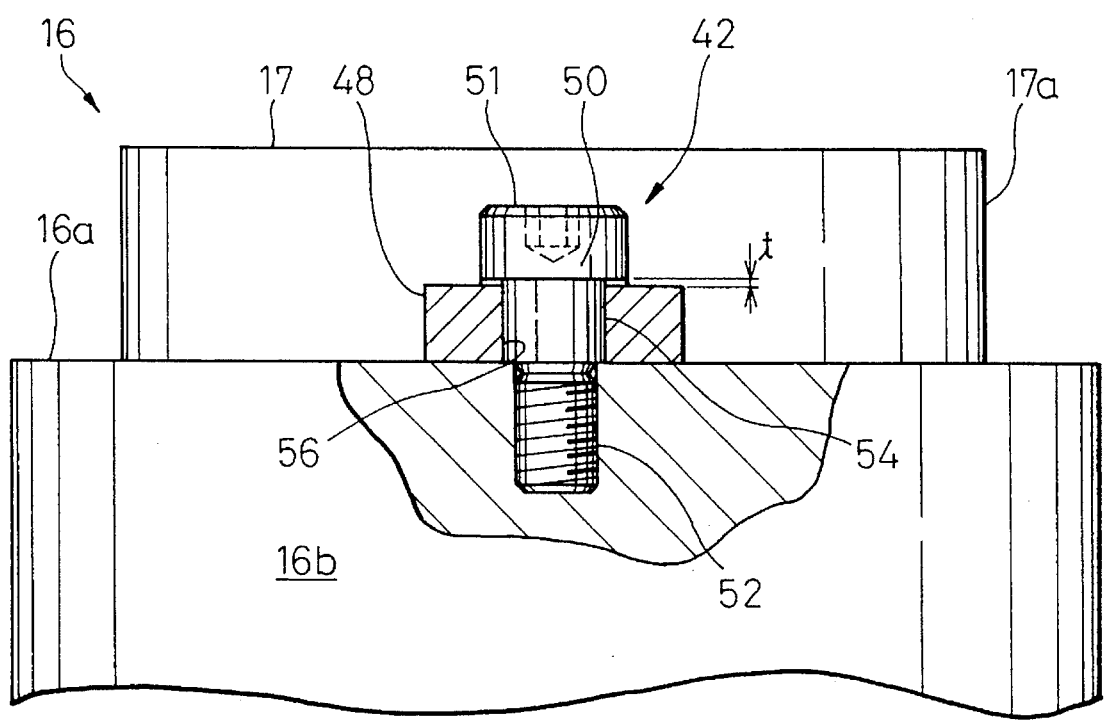
FIG. 3 is enlarged side elevation from the line B—B in FIG. 1 with partial section.

FIG. 3 illustrates a partial enlarged portion indicated by III in FIG. 1. FIG. 3 is also a schematic side elevation is the direction B—B in FIG. 2 and illustrates a partial section. Furthermore, in FIG. 3, the arrangement is inverted compared with that in FIG. 2. The fixed base 16 includes a base portion 16b, which is substantially cylindrical, and an island 17 protruding from the end face of the fixed base 16. The island 17 is also substantially cylindrical with an outer surface 17a, and is positioned so that the center line of the island 17 is aligned with that of the fixed base 16. The island 17 has a diameter smaller than that of the base portion 16b so that a ring face 16a is formed at the end of the fixed base 16. The cam assembly 42 is attached at a point diametrically opposite to the home position O on the ring face 16a.

The cam assembly 42 includes a limit cam 48 and a shaft 50. The configuration of the limit cam 48 is described hereinafter. The shaft 50 is essentially a bolt having a head portion 51 and threaded portion 52 at the opposite end thereof. A body portion 54 is provided between the head portion 51 and the threaded portion 52. The body portion 54 functions as a rotational shaft. The shaft 50 is screwed into a threaded hole in the ring face 16b after being inserted into a through hole 56 in the limit cam 48. Then, the outer surface of the body portion 54 faces the inner surface of the through hole 56, and the body portion 54 functions the rotational shaft for the limit cam 48. Thus, the limit cam 48 is attached to the ring face 16b of the fixed base 16 for rotation about the shaft 50.

The fit between the through hole 56 of the limit cam 48 and the body portion 54 of the shaft 50 is a clearance fit so that the limit cam 48 can rotate about the shaft 50 smoothly. Furthermore, in order to prevent rotation of the limit cam 48 being obstructed by contact between the head portion 51 and the limit cam 48, the dimension of the body portion 54 is such that a clearance "t" is kept therebetween. The clearance "t" is 0.1 mm–0.9 mm, preferably, about 0.5 mm. Although the head portion 51 of the shaft 50 is shown as a hexagon socket head in FIG. 3, it can also be a usual head without a hexagon socket.

Figure 4A:
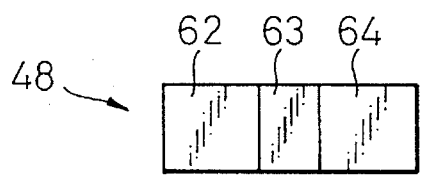
FIG. 4A is a side view of the limit cam.
Figure 4B:
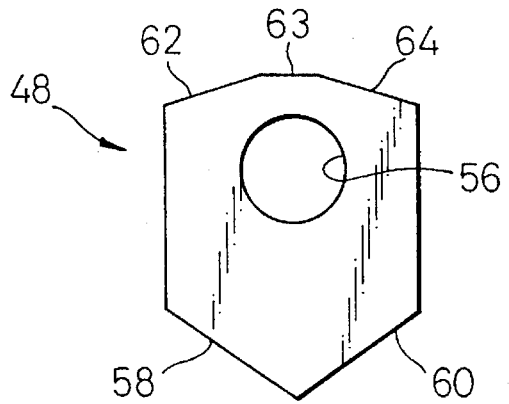
FIG. 4B is a plan view of the limit cam.

FIGS. 4A and 4B illustrate the side elevation and the plan view of the limit cam 48. The limit cam 48 is symmetrical heptagonal plate as shown in FIG. 4B. The limit cam 48 includes the through hole 56 through which the shaft 50 is inserted. The limit cam 48 has contact surfaces 58 and 60 adapted to contact a detecting portion 72 of a limit switch (FIG. 6) and abutment surfaces 62 and 64 adapted to abut the outer surface 17a of the island 17 of the fixed base as a stopping means. The abutment surfaces 62 and 64 are connected each other by a surface 63. Alternatively, the abutment surfaces 62 and 64 can be connected to each other by a ridgeline (not shown) extended parallel to the shaft 50. The limit cam 48 can be made of any material, preferably a plastic material such as nylon, having enough strength.

Figure 5:
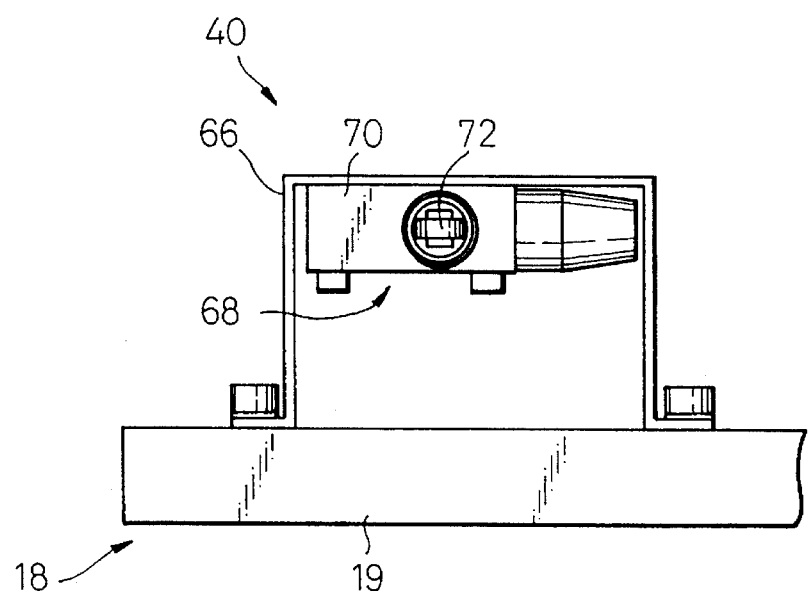
FIG. 5 is a enlarged side view of the portion V in FIG. 1 and illustrates the limit switch assembly.

The side elevation of the limit switch assembly 40 is shown in FIG. 5 which is also an enlarged illustration of the portion indicated by V in FIG. 1. Additionally, it should be noted that the arrangement in FIG. 5 is inverted compared with that in FIG. 1. The limit switch assembly 40 comprises a limit switch 68 and a cover 66 for the limit switch 68. The limit switch 68 is a conventional plunger type, and has a body 70 and a detecting portion 72. The limit switch 68 is secured to the inner side of the cover 66 by bolts. The cover 66 is secured to a bracket 19 portion of the rotating base 18 by bolts. The cover 66 is formed of a metal plate or of a molded plastic material.

The operation of the device in accordance with the preferred embodiment of the invention is described with reference to FIGS. 6–8 in which the rotating base 18 rotates in the clockwise direction in FIG. 2.

When the limit switch assembly 40 attached to the rotating base 18 rotates to a angular position of 176 degrees in the clockwise direction from the home position "O", the detecting portion 72 of the limit switch 68 contacts the contact surface 60 of the limit cam 48, and this forces the limit cam 48 to rotate in the clockwise direction about the shaft 50. At this time, the limit cam 48 does not contact the outer surface 17a of the island 17 as shown in FIG. 6. It should be noted that the limit cam 48 must be arranged so that the surface 63 does not contact the outer surface 17a of the island 17 at any time to allow the limit cam to rotate smoothly.

Figure 6:
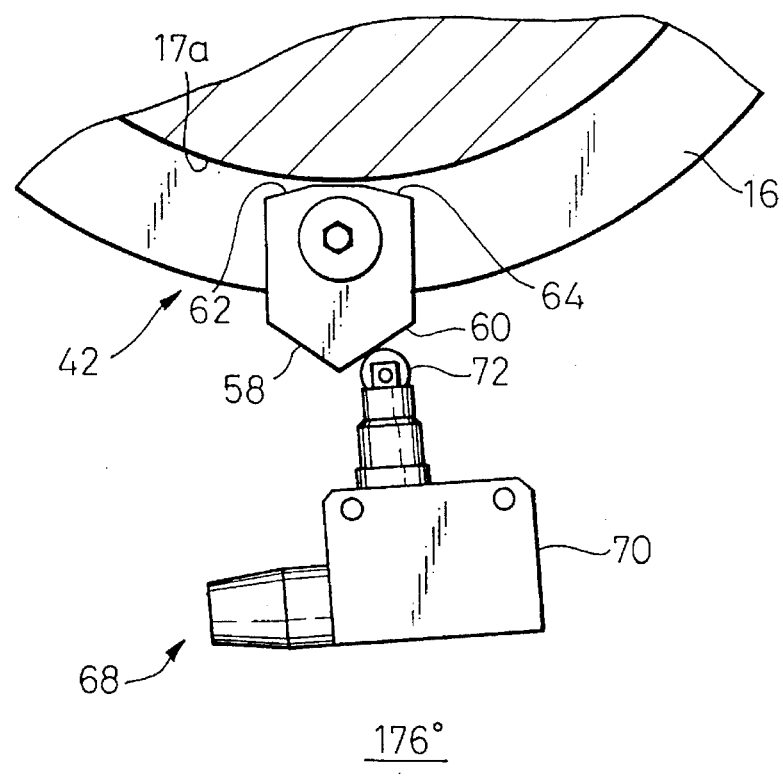
FIG. 6 is a schematic illustration for explaining the operation of the device of the invention.

When the rotating base 18 rotates further in the clockwise direction from the position shown in FIG. 6, the limit cam also rotates in the clockwise direction. When the rotating base 18 rotates to the angular position of 181 degrees (FIG. 7), the abutment surface 62 of the limit cam 48 abuts the outer surface 17a of the island 17, and the rotation of the limit cam 48 is stopped by the abutment therebetween. The detecting portion 72 of the limit switch 68 is pressed by the limit cam 48 in a direction indicated by an arrow C.

Figure 7:
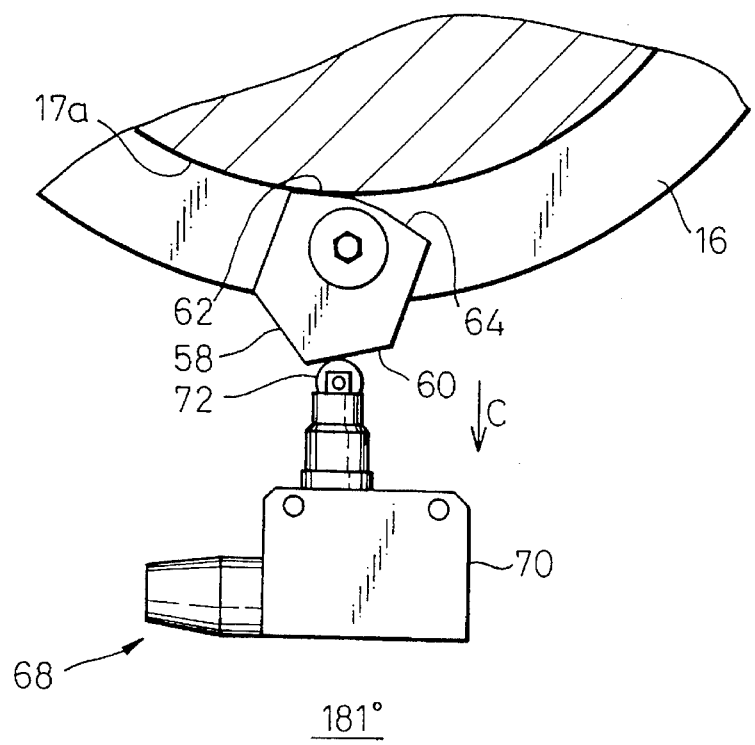
FIG. 7 is a schematic illustration for explaining the operation of the device of the invention.

When the rotating base 18 rotates further from the angular position shown in FIG. 7, the detecting portion 72 is depressed. Thus, the limit switch 68 detects the rotating base 18 reaching the limit of rotational motion, and sends a signal to the robot control unit. Upon receiving the detecting signal, the robot control unit stops the rotation of the rotating base 18. In the embodiment in the drawings, the rotating base 18 stops at the angular limit of 182 degrees from the home position (FIG. 2).

Figure 8:
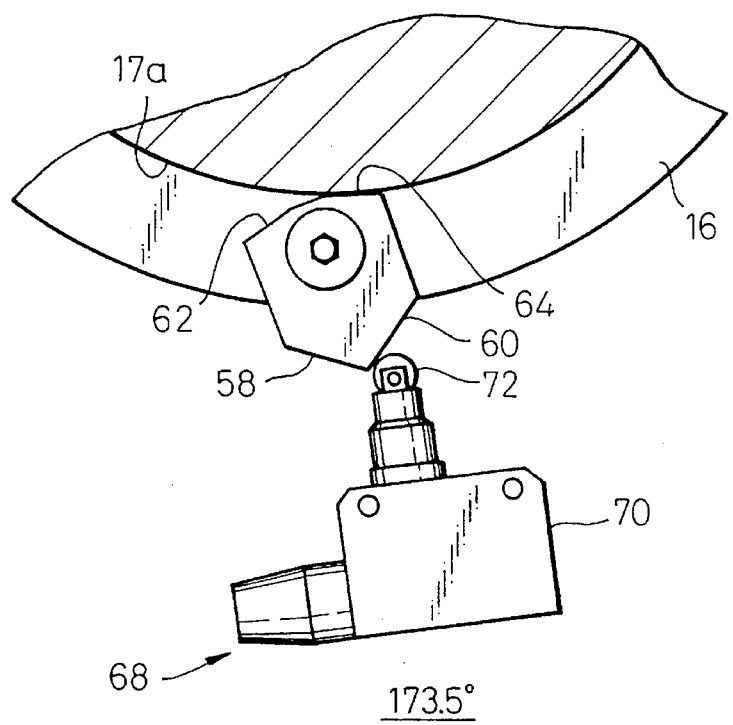
FIG. 8 is a schematic illustration for explaining the operation of the device of the invention.

In addition to the above, when the abutment surface 64 of the limit cam 48 contacts the outer surface 17a of the island 17, as shown in FIG. 8, when the limit switch 68 contacts the limit cam 48, the device of the invention will attain the same condition as shown in FIG. 6 due to the smooth rotation of the limit cam 48 in the clockwise direction. The operation of the device after the above condition attained is the same as described above.

Although the operation of the preferred embodiment has been described when the rotating base rotates in the clockwise direction in the drawings, it may be understood that the operation of the device of the invention is the same as described when the rotating base rotates in the counterclockwise direction.

Figure 9:
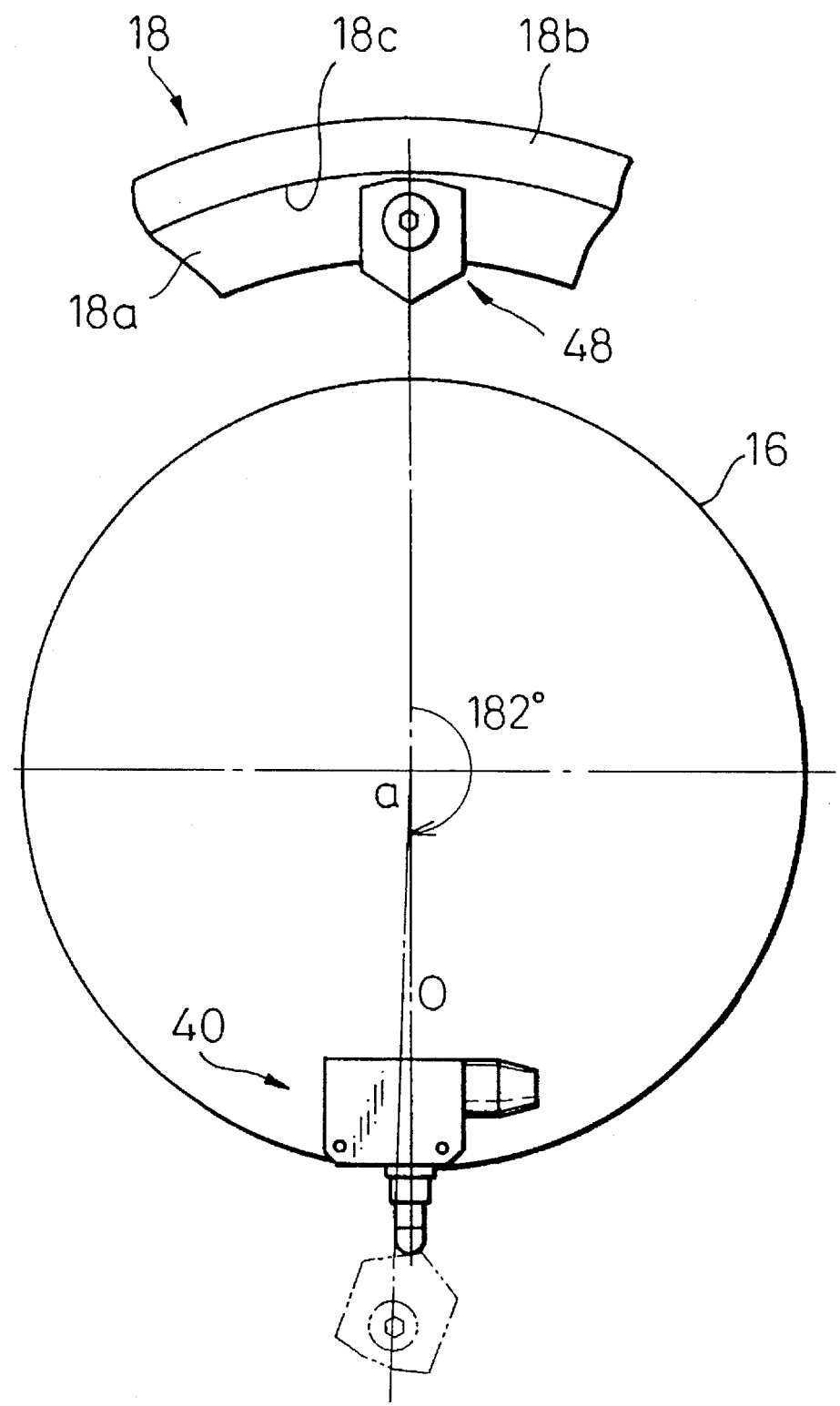
FIG. 9 is a schematic section along line A—A in FIG. 1 and illustrates the arrangement of the limit switch assembly and the cam assembly of the device according to another embodiment of the invention.
Figure 10:
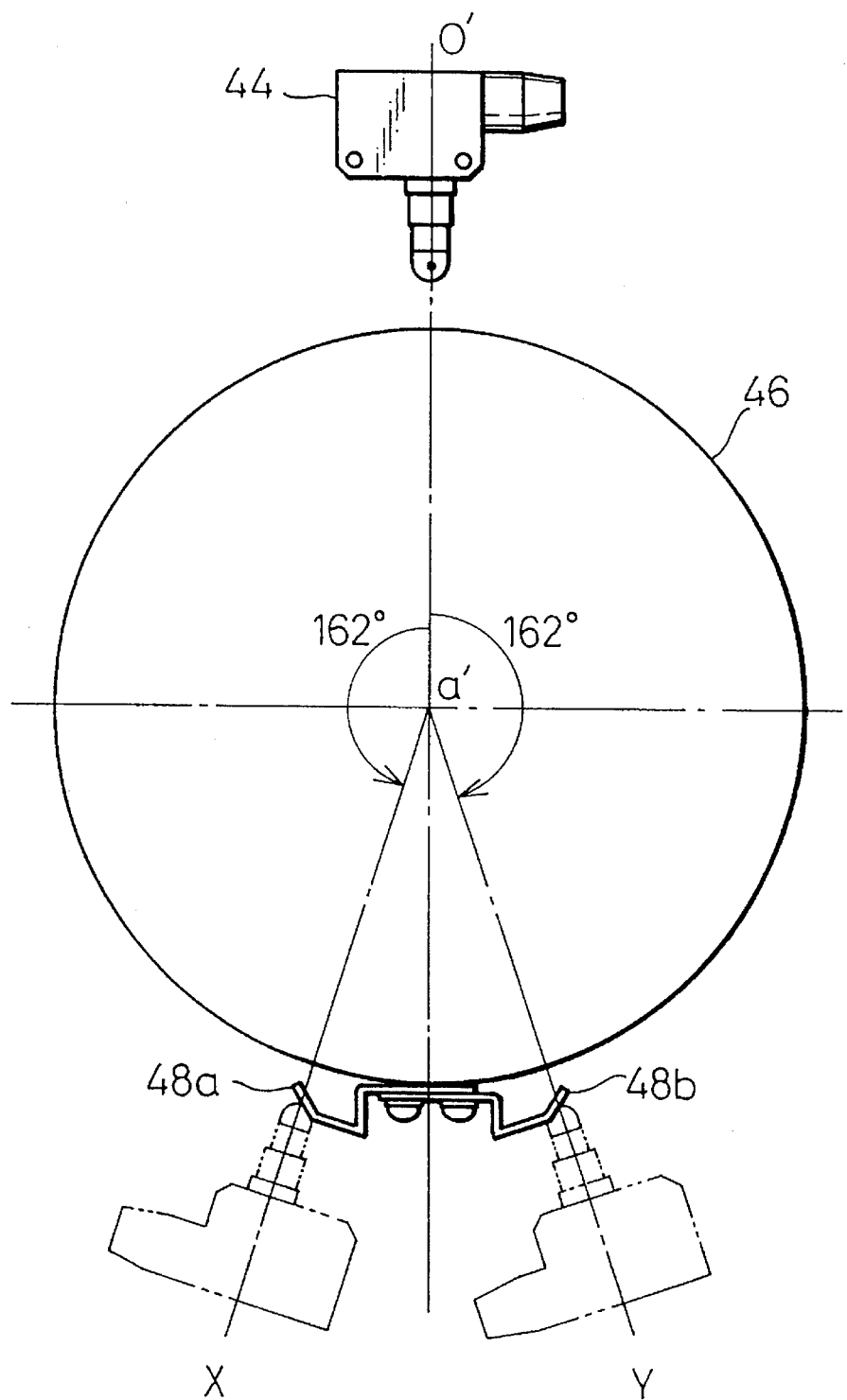
FIG. 10 is a schematic illustration of the prior art.

Furthermore, in the described embodiment, the limit switch assembly is attached to the rotating base, and the limit cam assembly is attached to the fixed base. However, the limit cam assembly can be attached to the rotating base and the limit switch assembly can be attached to the fixed base. Referring to FIG. 9, the fixed base 16 does not include island, but the rotating base 18 includes a ring face 18a and a circumferential wall 18b. The limit switch assembly 40 is attached to the fixed base 16, and the limit cam assembly 42 is attached to the ring face 18a of the rotating base 18. When the rotating base 18 and the limit cam assembly 42 rotate to the angular limit (in FIG. 9, the angular limit of 182 degrees in the clockwise direction from the home position), the rotation of the limit cam 48 about the shaft 42 (FIG. 3) is stopped by the abutment between the abutment surface 62 or 64 of the limit cam 48 and an inner surface 18c of the circumferential wall 18b.

Moreover, the abutment surfaces 62 and 64 of the limit cam 48 are substantially plane in the above embodiment. However, the abutment surfaces may be formed complementary to the outer surface 17a of the island 17 or the inner surface 18c of the circumferential wall 18b. In the above embodiment, although the limit cam 48 is heptagonal plate, the limit cam can be formed into any other suitable configuration such as a lever.

Furthermore, in the described embodiment, the device of the invention is provided on the fixed base and the rotating base which are provided between the base 12 and the robot arm 14, however, the device of the invention can be provided on the articulations 22, 24 and 26 of the robot arm 14.

From the above description, it may be understood that a total angular range of more than 360 degrees can be provided on the rotatable portion or the articulation of an industrial robot by the invention. Therefore, an industrial robot with the device of the invention can weld a full circle on the workpiece, in safety, without complex teaching.

What is claimed is:

1. A device for detecting the limits of the rotational motion of a rotating member in an industrial robot, which said rotating member rotates relative to a fixed member in a first and a second rotational direction about an axis, said device comprising;

a limit switch provided on one of said rotating member and said fixed member; and a contact piece for activating said limit switch, said contact piece being disposed on another of said rotating member and said fixed member, said contact piece being rotatable between first and second angular positions about an axis parallel to said axis of said members, wherein said rotating member can rotate relative to said fixed member a total of at least 360 degrees.

2. The device for detecting the limits of a rotational motion according to claim 1, in which one of said members is a fixed base having substantially a circular section and the other is a rotating base rotatably mounted onto said fixed base about said axis;

said fixed base including substantially a cylindrical island provided on an end face of said fixed base at substantially the center thereof so that the center axis of said island is aligned with that of said fixed base and has a diameter smaller than that of said fixed base;

said contact piece being attached to said fixed base;

said limit switch being a plunger type having a detecting portion at an end of said limit switch, and being attached to said rotating base so as to be able to contact said contact piece with said detecting portion when said rotating base rotates said limit switch to a position near one of said first and second limits; and said contact piece rotating about said axis thereof when said limit switch contacts said contact piece with said detecting portion of said limit switch.

3. The device for detecting the limits of a rotational motion according to claim 2, in which said contact piece is a limit cam having first and second abutment surfaces;

said limit cam being rotated, about said axis thereof by the contact between said limit cam and said detecting portion of said limit switch, to said first or second angular position when said rotating base is rotated to first and second limits of rotational motion respectively;

one of said abutment surfaced of said limit cam abuts the outer surface of said island when said limit cam rotates to one of said first or second angular positions, and the rotation of said limit cam being stopped by said abutment, said detecting portion of said limit switch being depressed by said stopped limit cam, whereby said limit switch is activated.

4. The device for detecting the limits of a rotational motion according to claim 1, in which one of said members is a fixed base having substantially a circular section and the other is a rotating base rotatably mounted onto said fixed base about said axis;

said rotating base including a circumferential wall along a circle, about said axis, having a diameter larger than that of said fixed base;

said contact piece being attached to said rotating base;

said limit switch being a plunger type having a detecting portion at an end of said limit switch, and being attached to said fixed base so as to be able to contact said contact piece with said detecting portion when said rotating base rotates said contact piece to a position near one of said first and second limits; and said contact piece rotating about said axis thereof when said limit switch contacts said contact piece with said detecting portion of said limit switch.

5. The device for detecting the limits of a rotational motion according to claim 4, in which said contact piece is a limit cam having first and second abutment surfaces;

said limit cam being rotated about said axis thereof by the contact between said limit cam and said detecting portion of said limit switch to said first and second angular position when said rotating base is rotated to first or second limits of rotational motion respectively;

one of said abutment surfaces of said limit cam abuts an inner surface of said circumferential wall when said limit cam rotates to one of said first or second angular positions, and the rotation of said limit cam is stopped by said abutment, said detecting portion of said limit switch being depressed by said stopped limit cam, whereby said limit switch is activated.

6. A device as recited in claim 1, wherein said rotating member can rotate relative to said fixed member a total of approximately 364°.

* * * * *